(12) United States Patent
Nishimura (10) Patent No.: US 6,942,801 B2
(45) Date of Patent: Sep. 13, 2005

(54) APPARATUS AND PROCESS FOR AEROBIC DIGESTION OF ORGANIC SLUDGE

(75) Inventor: Sosuke Nishimura, Sagamihara (JP)

(73) Assignee: Kurita Water Industries Ltd., Tokyo (JP)

( * ) Notice: Subject to any disclaimer, the term of this patent is extended or adjusted under 35 U.S.C. 154(b) by 122 days.

(21) Appl. No.: 10/352,471

(22) Filed: Jan. 28, 2003

(65) Prior Publication Data

US 2003/0150803 A1 Aug. 14, 2003

(30) Foreign Application Priority Data

Jan. 30, 2002 (JP) ....................................... 2002-021339

(51) Int. Cl.$^7$ ................................................ C02F 3/00
(52) U.S. Cl. ..................... 210/622; 210/758; 210/760; 210/194; 210/196; 210/150; 210/220; 210/623
(58) Field of Search ................................ 210/622, 758, 210/760, 194, 196, 150–151, 220, 623–627

(56) References Cited

U.S. PATENT DOCUMENTS 5,169,293 A * 12/1992 Yamamoto .................. 417/179

* cited by examiner

Primary Examiner—Chester T. Barry
(74) Attorney, Agent, or Firm—Flynn, Thiel, Boutell & Tanis, P.C.

(57) ABSTRACT

An apparatus for treating organic sludge by aerobic digestion has an aerobic digestion tank 1, a circulation line 6 provided with a pump for pumping circulated sludge, a liquid/gas ejector 7 for aspirating an oxygen-containing gas, which has been humidified, and for mixing it with the circulated sludge, a liquid/liquid ejector 8 for mixing the circulated sludge with sludge in a later step, a downward directing pipe 9 for passing downwards therethrough a gas/liquid mixture and an ozone-treated unit 31. The circulated sludge is mixed with an oxygen-containing gas in the liquid/gas ejector by jetting the circulated sludge into a throat 11 and passing the resulting mixture through the liquid/liquid ejector 8 and the downward directing pipe 9 to effect dissolution of oxygen into the sludge to cause aerobic digestion, while a gas/liquid mixed fluid composed of spent ozone gas and ozone-treated sludge is guided to an aspiration chamber 13 via a line 34 as humidified oxygen-containing gas in order to prevent clogging of the flow path in the aspiration chamber 13 due to drying of the sludge into solid crust.

14 Claims, 5 Drawing Sheets

APPARATUS AND PROCESS FOR AEROBIC DIGESTION OF ORGANIC SLUDGE

FIELD OF THE INVENTION

The present invention relates to an apparatus and a process for aerobic digestion of an organic sludge containing a biosludge.

THE PRIOR ART

As a technique for treating organic sludges comprising a biosludge, there has been provided a high-temperature digestion treatment which has found practical uses, in particular, in Europe and USA. The high-temperature digestion treatment consists of a biodegradative mass reduction of a sludge containing organic components by making use of the action of a thermophilic bacterium growing favorably at higher temperatures in the range of 30–70° C. and has a characteristic feature of being capable of accomplishing the treatment in a shorter residence time in the reactor than that required in a digestive biodegradation at medium temperatures lower than 30° C. For maintaining the digestion temperature at a high level, there have been utilized techniques, such as for example, utilization of the exothermic heat of biodegradation of the organic sludge being treated, use of externally supplied heat energy and so on.

If an ordinary gas diffuser is employed in the oxygen supply system in high-temperature digestion, it may often suffer from clogging trouble, since the concentration of the biosludge maintained in the high-temperature digestion tank may in many cases be higher than that used in a commonly employed aeration tank. For this reason, systems permitting formation of fine bubbles by a mechanical action, such as a system using a self-sucking submerged impeller, a system using an ejector and so on, are employed therefore. However, even if such an oxygen supply system is employed, clogging trouble may occur, in particular, at such a portion in the pathway for supplying the oxygen-containing gas where the pathway joins with a flow of sludge. In the system using a submerged impeller, the air conduction pathway may usually be constructed as a straight duct open to the external atmosphere and, thus, is relatively easy for cleaning work, whereas in the system using an ejector, the air conduction pathway will usually have to be designed to include curved portions and, thus, is particularly difficult to perform cleaning work.

It has also been practiced to incorporate such a technical measure that the biosludge in the digestion tank is drawn out and is subjected to a modification treatment, such as ozone treatment, to convert it into an easily biodegradable product, which is then returned to the digestion tank, in order to elevate the degree of digestion of the biosludge in an aerobic digestion.

In an aerobic digestion employing concurrently such a modifying treatment as above, the digestion tank suffers from severe foaming of the liquor therein, since the modified biosludge reveals a strong tendency to foaming and foaming causal substances may sometimes be produced in the biodegradation of the modified biosludge and since it is necessary to rely on a more increased rate of aeration through the gas diffuser for realizing oxidative biodegradation of the modified biosludge as compared with the case where no modification of the biosludge is employed. Therefore, problems may be brought about in that the appearance of the installation is deteriorated, in that the cleaning works may become more bothersome and in that, in a more unfavorable case, the biosludge necessary for the biodegradation may be brought away together with the foam flooding off the digestion tank.

Such a foaming phenomenon is remarkable in particular in a high-temperature aerobic digestion tank in which the sludge temperature is held in the range of 30–70° C. While addition of an antifoaming agent may be considered for suppressing foaming phenomenon, such a measure is not favorable, since use of an antifoaming agent may cause inefficiency of the apparatus due to reduction of the dissolution rate of oxygen into the sludges and since it may cause a fear of deterioration of the digestion performance due to possible accumulation of difficultly biodegradable antifoamer components in the digestion tank.

By the investigations for the causal reason of the clogging phenomenon, the inventors discovered that splashes of the sludge adhere onto wall surfaces of the pathway for supplying the oxygen-containing gas and concentrate there to become fast thereto due to the low humidity of the oxygen-containing gas and due to the high temperature of.the aerobic digestion tank, causing them gradually to clog the pathway and eventually to block sufficient supply of the oxygen-containing gas, which has led to the completion of the present invention.

SUMMARY OF THE INVENTION

An object of the present invention is to provide an apparatus and a process for aerobic digestion of organic sludges containing biosludge, in which clogging of the supply line for oxygen-containing gas is prevented and the digestion can be performed efficiently in a steady manner over a prolonged period of time.

Another object of the present invention is to provide an apparatus and a process for aerobic digestion of organic sludges containing biosludge, in which clogging of the supply line for oxygen-containing gas is prevented and the digestion can be performed efficiently in a steady manner over a prolonged period of time with an increased degree of digestion of the biosludge.

A further object of the present invention is to provide an apparatus and a process for aerobic digestion of organic sludges containing biosludge, in which clogging of the supply line for oxygen-containing gas is prevented and the digestion can be performed efficiently in a steady manner over a prolonged period of time with an increased degree of digestion of the biosludge together with attainment of prevention of foaming phenomenon.

Thus, the present invention resides in the following apparatus and process for aerobic digestion of organic sludges:

(1) An apparatus for aerobic digestion of an organic sludge containing a biosludge, comprising an aerobic digestion tank for realizing an aerobic biological digestion of the organic sludge introduced thereinto by an oxygen-containing gas supplied thereto, a circulation line provided with a pump for drawing out the sludge in the aerobic digestion tank and pressing them into the aerobic digestion tank, a liquid/gas ejector for aspirating the oxygen-containing gas and mixing it with the circulated sludge delivered via the circulation line to form a gas/liquid mixed flow, an oxygen-containing gas supply line for supplying the oxygen-containing gas to the liquid/gas ejector, a means for humidifying the oxygen-containing gas and a downward directing pipe extending towards the bottom of the aerobic digestion tank, for passing downwards therethrough the gas/liquid mixed flow formed by the liquid/gas ejector.

(2) The apparatus as defined in the above (1), wherein it further comprises
a modifier for modifying a part of the sludge extracted from the digestion tank into an easily biodegradable product and
a modified sludge return line for returning the modified sludge from the modifier to the aerobic digestion tank.

(3) The apparatus as defined in the above (1) or (2), wherein it further comprises
a liquid/liquid ejector disposed submergedly in the sludge in connection with the downward directing pipe for mixing the sludge sucked up from the upper part of the aerobic digestion tank with the gas/liquid mixed flow by making use of the hydrodynamic action of the gas/liquid mixed flow gushing from the liquid/gas ejector.

(4) The apparatus as defined in any one of the above (1) to (3), wherein the aerobic digestion tank is designed to realize a high-temperature aerobic digestion of the organic sludge at a sludge temperature as high as 30–70° C.

(5) The apparatus as defined in any one of the above (1) to (4), wherein the means for humidifying the oxygen-containing gas is designed to bring the oxygen-containing gas into contact with one or more humidifying substances selected from the group consisting of water, organic sludges, the sludge in the aerobic digestion tank, the modified sludge, other liquids, the exhausted gas from the modifier and other humidified gases.

(6) The apparatus as defined in any one of the above (2) to (5), wherein the modifier is an ozone-treating unit.

(7) The apparatus as defined in the above (6), wherein the means for humidifying the oxygen-containing gas is designed to bring the oxygen-containing gas into contact with the ozone-treated sludge and/or with the exhausted gas from the ozone-treating unit.

(8) A process for aerobic digestion of an organic sludge containing a biosludge, comprising
performing an aerobic biological digestion of the organic sludge in an aerobic digestion tank by an oxygen-containing gas supplied thereto,
drawing out the sludge in the aerobic digestion tank and pumping it into the aerobic digestion tank by a pump via a circulation line,
aspirating the oxygen-containing gas, which has been humidified, by using a liquid/gas ejector, to mix it with the circulated sludge delivered via the circulation line to form a gas/liquid mixed flow, and
passing the gas/liquid mixed flow formed by the liquid/gas ejector downwards through a downward directing pipe extending towards the bottom of the aerobic digestion tank.

(9) The process as defined in the above (8), wherein it further comprises
extracting out a part of the sludge in the aerobic digestion tank therefrom and modifying it in a modifier into an easily biodegradable product and
returning the modified sludge obtained in the modifier to the aerobic digestion tank.

(10) The process as defined in the above (8) or (9), wherein the sludge in the upper part of the aerobic digestion tank is sucked up and mixed with the gas/liquid mixed flow by making use of the hydrodynamic action of the gas/liquid mixed flow gushing from the liquid/gas ejector, the resulting mixture being guided into the downward directing pipe.

(11) The process as defined in any one of the above (8) to (10), wherein the organic sludge is subjected to a biological treatment by a high-temperature aerobic digestion at a temperature as high as 30–70° C.

(12) The process as defined in any one of the above (8) to (11), wherein the oxygen-containing gas is humidified by bringing the oxygen-containing gas into contact with one or more humidifying substances selected from the group consisting of water, organic sludges, the sludge in the aerobic digestion tank, the modified sludge, other liquids, the exhausted gas from the modifier and other humidified gases.

(13) The process as defined in any one of the above (8) to (12), wherein the modification is effected by an ozone treatment.

(14) The process as defined in any one of the above (8) to (13), wherein the concentration of oxygen in the oxygen-containing gas is 30–100 volume % and the supply rate of the oxygen-containing as per 1 $m^3$ of the capacity of the aerobic digestion tank amounts to 0.1–0.4 $Nm^3/hr$.

DETAILED DESCRIPTION OF THE INVENTION

The organic sludges to be treated by the apparatus or the process for aerobic digestion according to the present invention consist in organic sludges containing a biosludge, wherein those containing a biosludge as a predominant component are favorable, though they may contain other organic and/or inorganic substances in addition to the biosludge. As the biosludge, there may be exemplified those resulting from a biological treatment of organic wastes, such as sewage waters, night soils, industrial waste waters and so on, including so-called activated sludge and digested sludge. The organic sludges are those containing such biosludge as above and may be sludge mixtures which comprise other organic or inorganic substances, such as precipitated sludges from sewage water and so on, in addition to biosludges. Such sludges include not only those resulting from water treatment processes and the like present in a form of a slurry, but also dewatered cakes obtained by dewatering such slurry-form sludges.

According to the present invention, the aerobic digestion of an organic sludge containing a biosludge is carried out by performing an aerobic biological digestion of the organic sludge in an aerobic digestion tank by an oxygen-containing gas supplied thereto, drawing out the sludge in the aerobic digestion tank and pumping it into the aerobic digestion tank by a pump via a circulation line, aspirating the oxygen-containing gas which has been humidified and mixing it with the circulated sludge delivered via the circulation line by a liquid/gas ejector to form a gas/liquid mixed flow, and passing the gas/liquid mixed flow formed by the liquid/gas ejector downwards through a downward directing pipe extending towards the bottom of the aerobic digestion tank. Here, it is permissible to extract a part of the sludge in the aerobic digestion tank to modify it in a modifier, such as an ozone-treating unit, into an easily biodegradable product, wherein the resulting modified sludge is supplied to the aerobic digestion tank to subject it to the aerobic digestion. It is permissible here to effect humidification of the oxygen-containing gas by guiding the humidifying substances, i.e., the modified sludge and/or the exhaust gas from the modifier, such as the ozone-treating unit, to the humidifying means to humidify the oxygen-containing gas, whereupon the therapy humidified oxygen-containing gas is guided therefrom to the liquid/gas ejector.

The aerobic digestion tank (in the following, sometimes referred to simply as the digestion tank) constituting the apparatus for aerobic digestion of organic sludges according to the present invention consists of a digestion tank for performing biological treatment in an aerobic condition by introducing thereinto the organic sludges as the material to be treated, while supplying an oxygen-containing gas thereto, in which a liquid/gas ejector and a downward directing pipe, as described later, are incorporated as a means for realizing efficient dissolution of the oxygen-containing gas. As the oxygen-containing gas, there may be used, for example, atmospheric air, an oxygen-enriched air, ozone-containing gas, spent ozone gas and so on.

For the digestion tank, it is favorable to use a high-temperature digestion tank operable to subject the organic sludge to biological treatment at a sludge temperature as high as 30 to 70° C., preferably 50 to 60° C. Even in this case, an efficient aerobic digestion can be attained under prevention of clogging of the supply line for the oxygen-containing gas by the apparatus according to the present invention, by causing the oxygen-containing gas, which has been humidified, to be aspirated by means of a liquid/gas ejector.

Aerobic digestion requires oxygen and, usually, an aeration by atmospheric air is performed. However, since atmospheric air has an oxygen concentration of about 21 volume %, the aeration efficiency is low, in addition to a disadvantage of a higher dissipation rate of heat. It may thus be considered as favorable to use a gas rich in oxygen, in particular, pure oxygen, in view of expenses for the heat insulation and for the aeration operation. However, use of an oxygen-rich gas suffers from a problem that exhaustion of carbon dioxide gas formed during the digestion becomes difficult, resulting in a decrease in the digestion activity. In order to warrant a flow rate of the aeration gas capable of expelling carbon dioxide gas formed during the digestion, it may be preferable to perform the aeration by supplying, in addition to the oxygen-rich gas, an amount of air required for discharging the carbon dioxide gas. As the oxygen-containing gas, there may be employed an oxygen-added air in which the concentration of oxygen in the atmospheric air is increased. The oxygen concentration in the oxygen-containing gas may favorably be at least 50% by volume, preferably at least 70% by volume. In specific practice, the aeration may be effected in such a way that the liquor in the digestion tank is held under circulation and the oxygen-rich gas and atmospheric air are admixed with the circulating liquor, before they are supplied to the digestion tank. Here, it is favorable to control the rate of addition of air so as to maintain the pH value of the digested sludge in the range from 6 to 8, preferably from 6.5 to 7.7, by observing the pH value of the digested sludge in the digestion tank, since thereby control of the operation of the aeration is simplified.

In the digestion tank, there are arranged a circulation line provided with a pump for drawing the sludge (liquor in the digestion tank) out therefrom and pumping it to recirculate into the digestion tank and with a liquid/gas ejector for mixing the circulated sludge guided by the pump from the circulation line with the oxygen-containing gas, which is humidified, to form a gas/liquid mixed flow.

The liquid/gas ejector is disposed at the discharge end of the circulation line so as to form the gas/liquid mixed flow under aspiration of the humidified oxygen-containing gas, wherein the ejector may favorably be arranged in such a manner that the throat end thereof is held under intrusion into the layer of the sludge liquor so as to cause the gas/liquid mixed flow to be jetted into the sludge liquor. Here, it is favorable that a liquid/liquid ejector is installed in connection to the downward directing pipe in such a way that it is submerged in the sludge liquor so as to suck up the sludge liquor in the digestion tank by making use of the action of the gas/liquid mixed flow gushing out of the liquid/gas ejector to thereby effect mixing of them. By installation of the liquid/liquid ejector, the efficiency of dissolution of the oxygen-containing gas into the sludge liquor can further be increased.

The liquid/gas ejector functions to aspirate the humidified oxygen-containing gas from the oxygen-containing gas supply line and to mix it with the sludge liquor circulated through the circulation line to cause the gas to be dispersed as fine bubbles in the sludge liquor and, in addition, to enable the mixing of a larger amount of the sludge in the upper part of the digestion tank with the gas by the sucking action imparted to the sludge liquor under utilization of the highly energetic hydrodynamic power of the gas/liquid mixed flow gushing out from the throat of the liquid/gas ejector by using this throat as the suction nozzle of the liquid/liquid ejector. When the oxygen-containing gas is sucked into the circulating sludge liquor by means of the liquid/gas ejector, a gas/liquid mixed flow of highly energetic power is built up by summation of the actions of the circulated sludge liquor and of the oxygen-containing gas, so that suction of the sludge liquor can be attained by utilizing the nascent energetic power of the gas/liquid mixed flow as such, by jetting the gas/liquid mixed flow from the throat of the liquid/gas ejector directly into the nozzle of the liquid/liquid ejector connected directly thereto.

By installation of the liquid/liquid ejector, a larger amount of sludge liquor can be sucked up by making use of the highly energetic action of the gas/liquid mixed flow, together with attainment of more finer disintegration of the gas bubbles under utilization of this high energy flow of the sludge liquor sucked thereinto. While gas bubbles tend to join together to form larger bubbles when the sludge mixture is held under mild agitation even though they are in a finely disintegrated state, such a tendency to unite together can be prevented by passing the mixture downwards through a downward directing pipe, since the sludge mixture flows in the direction reverse to the floating force acting onto the bubbles to there by cause a violent agitation of the mixture, whereby the dissolution of oxygen into the sludge is facilitated together with the prevention of joining together of the bubbles mentioned above.

The liquid/gas ejector may favorably be disposed at the end of the circulation line in a position above the liquid level of the digestion tank at a site of, in particular, the aeration part in such a manner that the front end of the throat thereof is held submerged under intrusion into the liquid layer. The liquid/gas ejector may be composed of a nozzle disposed at the front end of the circulation line, an aspiration chamber arranged so as to surround the nozzle, an aspiration inlet opening into the aspiration chamber and a throat formed at the front end of the aspiration chamber so as to intrude into the liquid layer.

The liquid/liquid ejector may be constructed from (1) a nozzle which consists of the above-mentioned throat of the liquid/gas ejector, (2) a throat disposed in the mass of the sludge in opposition to the above nozzle and (3) a liquid sucking gas formed between the nozzle (1), i.e. the front end of the above throat, and the throat (2).

The liquid/gas ejector functions to aspirate the gas by jetting the sludge liquor and the liquid/liquid ejector functions to suck up a sludge liquor by jetting the sludge liquor. It is favorable to arrange the nozzle of the liquid/gas ejector on a vertical straight axis to be opposite to the throat thereof, since thereby the flowing energy of the circulating sludge is not restrained. It is favorable to arrange also the throat of the liquid/gas ejector, namely, the nozzle of the liquid/liquid ejector, on a vertical straight axis to be opposite to the throat of the liquid/liquid ejector, since thereby the flowing energy of the gas/liquid mixed flow is not restrained. It is preferable to let the front end of the throat of the liquid/gas ejector be left cut open without forming a contraction, since thereby the flowing energy of the gas/liquid mixed flow is not restrained. It is preferable to shape the throat of the liquid/liquid ejector in such a manner that the mid-portion is contracted and the sucking end and the discharge end are widened outwards. The discharge end joins to a downward directing pipe of widened diameter, which opens towards the bottom of the digestion tank.

It is preferable that the relationship between the nozzle diameter D1 and the throat diameter D2 of the liquid/gas ejector and the throat diameter D3 (at the narrowest portion) of the liquid/liquid ejector is such that the ratio D1/D2 is in the range from 0.5 to 0.8 and the ratio D2/D3 is in the range from 0.4 to 0.7, since thereby the aspiration rate for the oxygen-containing gas and the sucking rate for the sludge liquor are increased. It is preferable to design the liquid/gas ejector so that its throat has a length of 4–10 times the diameter thereof. It is favorable that the throat of the liquid/liquid ejector has a length of 5–15 times the diameter (narrowest portion) thereof, since thereby the pressure drop can be decreased and finer gas bubbles can be formed.

It is permissible that the liquid/gas ejector is designed in such a manner that one end thereof communicates with the circulation line and the other end is connected to the downward directing pipe. Here, the gas/liquid mixed flow formed by the liquid/gas ejector is jetted directly into the downward directing pipe without passing through a liquid/liquid ejector.

The apparatus according to the present invention may preferably be constructed so that the sludge liquor in the digestion tank is sucked up and pumped to pass through the circulation line by a pump. The digestion tank is constructed so as to accomplish the aeration described above, wherein it is preferable that the digestion tank is partitioned by a partition wall into an aeration section and a sludge discharge section and the circulation line is designed to circulate the sludge liquor from the sludge discharge section to the aeration section. The sludge discharge section may preferably be provided with an exit port (to a digested sludge line) at a portion of a level lower than the overflow edge of the partition wall, so as to thereby enable the removal of foam floating on the liquid surface in the aeration section together with the overflowing digested sludge. The digestion tank may preferably be covered over the aeration section and the sludge discharge section inclusive of the liquid/gas ejector with a coverage so as to build a substantially sealed structure, since thereby the foam floating on the liquid surface can be removed by making use of the pressure of the aspirated oxygen-containing gas. In case the exit port for the digested sludge is disposed at a level lower than the liquid surface in the sludge discharge section, a gas discharge line should be provided separately. It is preferable to arrange a foam destroying means in the vicinity of the gas discharge line, in order to prevent the overflow of foam into the gas discharge line. As the foam destroying means, there may be employed, for example, a device in which turbine blades are installed.

The sludges digested in the digestion tank may be extracted via the digested sludge line or via an excess sludge extracting line to dispose of or to subject them to solid/liquid separation by means of, for example, a centrifuge, in order to discard the supernatant and to return the concentrated biosludge to the digestion tank. By returning the concentrated biosludge resulting from the solid/liquid separation to the digestion tank, the substantial residence time of the biosludge in the digestion tank can be increased to thereby attain an increased rate of biodegradation of the biosludge.

The oxygen-containing gas to be aspirated by the liquid/gas ejector is humidified. For attaining humidification of the oxygen-containing gas, a means for humidifying the oxygen-containing gas is used to bring the oxygen-containing gas into contact with one or more humidifying substances selected from the group consisting of water, organic sludges, the sludge in the aerobic digestion tank, the modified sludge, other liquids, the exhausted gas from the modifier and other humidified gases.

As the means for humidifying the oxygen-containing gas, there may be employed, for example, a humidifying unit in which the oxygen-containing gas is introduced into a water basin filled with water to obtain humidified oxygen-containing gas. It is also possible to proceed in such a way that a liquid or a gas for the humidification is supplied to the oxygen-containing gas supply line via a humidifying liquid or gas feed line to effect mixing of the oxygen-containing gas with the liquid or the gas for the humidification. As the humidifying liquid, for example, water, organic sludges, the sludge liquor. present in the digestion tank and so on, may be used. The feed rate of the humidifying liquid may favorably be such that the volume ratio of the humidifying liquid to the oxygen-containing as, i.e. liquid gas, is in the range from 1/1,000 to 20/1, preferably from 1/10 to 10/1, with the proviso that supply of the oxygen-containing gas is not obstructed. As the humidifying gas, gases having high humidity resulting from, for example, contact with aqueous liquids, may be employed.

It is also possible to proceed in such a way, that a part of the sludge liquor in the digestion tank is extracted out and is subjected to a modification in a modifier provided for bringing the sludge into an easily biodegradable product, whereupon the resulting modified sludge is guided as the humidifying liquid to the humidifying liquid feed line. The humidifying liquid may be fed at a feed rate described above but so as not to obstruct the gas supply, in either a continuous or intermittent way. In the case where an ozone-treating unit is used as the modifier, the spent ozone gas can be used as the humidifying gas, since the spent ozone gas has a high humidity due to contact with the sludge liquor during the ozone treatment.

As the modifier mentioned above, any voluntary apparatus may be used, so long as it permits the modification of the extracted sludge into an easily biodegradable product by adding chemical(s) and/or energy to the sludge. For instance, there may be employed modifying apparatuses, such as those by treatment with ozone (ozone-modifier), those by treatment with hydrogen peroxide, those by treatment with an acid, those by treatment with an alkali, those by treatment by heating and those by treatment by high voltage pulse discharge; grinding apparatuses, such as those using a ball mill, colloid mill and so on; and combinations of these apparatuses. Among them, preference is given to an ozone-modifier, since it permits easy and simple operation with a higher treating efficiency, in addition to the advantageous feature of permitting the use of the spent ozone gas as the oxygen containing gas to be supplied to the liquid/gas ejector.

For the ozone-modifier, apparatuses which can afford to carry out ozone treatment of so-called extracted sludge obtained by extracting a part of the sludges in the digestion tank, by causing it to contact with ozone, can be used. By the oxidative action of ozone, biosludges are converted into easily biodegradable products. When the ozone-treatment is carried out at an acid pH of 5 or lower, a higher reaction efficiency of the oxidative decomposition can be attained. For effecting adjustment of the pH, it is preferable to use the addition of an inorganic acid, such as sulfuric acid, hydrochloric acid or nitric acid, as a pH-regulator. Using such a pH-regulator, it is preferable to adjust the pH to 3–4.

The ozone-treatment can be carried out by causing the extracted sludge to contact with ozone as such or, if necessary, after having been pretreated by concentration by, for example, a centrifuge, and subsequent adjustment of the pH to 5 or lower. For attaining contact with ozone, there may be utilized a practice of ozone bubbling by guiding ozone into the digestion tank, a technique of agitation by mechanical stirring, a technique using a packed bed or so on. For the ozone-treating gas, ozone-containing gases, such as ozonized oxygen, ozonized air and the like, may be employed. Ozone may favorably be used in an amount of 0.1–10% by weight, preferably 1.5–5% by weight, based on the weight of the solid matter of the sludge to be treated. By the ozone-treatment, biosludges are subjected to oxidative decomposition and are converted into BOD components.

For the hydrogen peroxide-treating apparatus as the modifier, those which can afford the realization of the modification reaction by guiding the extracted sludge into a treating tank while supplying hydrogen peroxide thereto to cause them to contact with each other to effect the modification may be employed. Here, the amount of hydrogen peroxide to be used may be in the range of 0.001–0.2 gram of $H_2O_2$ per one gram of SS (suspended solids). It is favorable here to adjust the pH of the extracted sludge to 3–5 by adding an acid, such as hydrochloric acid, thereto, wherein a preferable amount of hydrogen peroxide to be used lies in the range of 0.001 to 0.07 gram of $H_2O_2$ per one gram of SS. In order to promote the reaction, it is permissible to warm the reaction mixture or to incorporate a catalyst, such as ferrous ion.

For the acid-treating apparatus as the modifier, those which can afford the realization of the modification by guiding the extracted sludge into a treating tank, adding thereto a mineral acid, such as hydrochloric acid or sulfuric acid, and maintaining them therein for a predetermined residence time under an acidic condition of a pH of 2.5 or lower, preferably a pH of 1–2, may be employed. The residence time may be, for example, 5–24 hours. Here, it is preferable to heat the sludge at a temperature of, for example, 50–100° C., to facilitate the modification.

For the alkali-treating apparatus as the modifier, those which can afford the realization of the modification by guiding the extracted sludge into a treating tank, adding thereto an alkali, such as sodium hydroxide, potassium hydroxide or so on, in an amount of 0.1–1%, based on the weight of the sludge, and maintaining the mixture for a predetermined residence time, can be employed. Organic sludges may be modified into easily biodegradable products during a residence time of 0.5–2 hours. Here, the organic sludge may preferably be heated at a temperature of, for example, 50–100° C., in order to facilitate the modification.

While it is permissible to employ for the modification a heating means which has only a heating function, use of a heating means capable of serving for heating and acid- or alkali-treatment in combination may be favorable. In the case of using a heating means serving only for heating, a sludge temperature of, for example, 70–100° C., and a residence time of, for example, 2–3 hours, may be recommended.

For the high voltage pulse discharge modifier, those which can realize the modification under recirculation of the modified sludge liquor may be employed, in which the sludge to be modified is guided under recirculation between electrodes composed of an anode (+pole) made of, for example, a wolfram/thorium alloy or the like, and a cathode (−pole) made of, for example, a stainless steel or the like, disposed at an electrode distance of 3–10 mm, preferably 4–8 mm, between which an electric voltage of 10–50 kV, preferably 20–40 kV, is imposed in pulses with a pulse frequency of 20–80 Hz, preferably 40–60 Hz, so as to cause pulse discharge.

The resulting sludge modified into an easily biodegradable product is subjected to an aerobic biodegradation in the digestion tank under anabolism by microbes. The performance of digestion of the sludge can thereby be increased. The modified sludge may either be guided to the oxygen-containing gas supply line through the line for the humidifying liquor so as to use it for humidifying the oxygen-containing gas, before a part or the entirety of the sludge is returned to the digestion tank via the liquid/gas ejector, or be returned partially or wholly to the digestion tank without being utilized for humidification of the oxygen-containing gas. For the case of modification by ozone treatment, the gas/liquid mixed flow composed of the spent ozone-containing gas and the treated sludge may be used as the humidified oxygen-containing gas and guided to the liquid/gas ejector via the supply line for the oxygen-containing gas. This embodiment is so far advantageous as the spent ozone gas can be utilized as the oxygen-containing gas and installation of the remaining ozone decomposer for the spent ozone gas can be dispensed with. For the case where the ozone-treated sludge is returned to the digestion tank without being utilized for humidifying the oxygen-containing gas, the treated sludge may be subjected to separation of the sludge from the spent ozone gas using, for example, a gas/liquid separation vessel, before being returned to the digestion tank.

By the technical measure of humidifying the oxygen-containing gas before it is supplied to the liquid/gas ejector, the frequency of cleaning of the apparatus can be reduced. This is because the splashes of sludge liquor adhering on the internal wall surfaces of the oxygen-containing gas supply line are prevented from being dried to solids held fast thereon as dry crusts due to being heated to a higher temperature, since the oxygen-containing gas is humidified.

In case where the modified sludge is guided to the liquid/gas ejector or returned to the digestion tank, the foaming phenomenon found in the digestion tank may occasionally be emphasized, in particular, when a high-temperature digestion tank is used as the digestion tank. Even in such a case as above, the aerobic digestion can be carried out efficiently under a condition in which the foaming phenomenon is suppressed and the concentration of dissolved oxygen necessary for effecting the aerobic digestion is maintained, when the oxygen concentration in the oxygen-containing gas aspirated by the liquid/gas ejector is in the range from 30 to 100% by volume, preferably from 50 to 100% by volume, and the rate of supply of the oxygen-containing gas is controlled to be in the range from 0.1 to 0.4 $Nm^3$/hr, preferably from 0.2 to 0.4 $Nm^3$/hr, per one $m^3$ of the capacity of the digestion tank.

Such control of the rate of supply of the oxygen-containing gas may be realized by a technical measure of, for example, adjusting the opening degree of the value disposed in the oxygen-containing gas supply line or adjusting the pumping pressure or the flow rate of a pump disposed in the circulation line. Usually, the dissolved oxygen concentration in the sludge liquor supplied to the digestion tank will be zero, when an oxygen-containing gas having an oxygen concentration as given above is supplied in a usual way to the digestion tank at a supply rate as given above, so that aerobic digestion can never be caused. However, by the apparatus and process according to the present invention, aerobic digestion of sludge liquor can be realized efficiently under a condition in which the concentration of the dissolved oxygen in the sludge liquor requisite for realizing the aerobic digestion is maintained since a liquid/gas ejector in a form of downward directing pipe, which can dissolve the requisite amount of oxygen-containing gas in the sludge liquor efficiently, is used according to the present invention.

By actuating the pump to draw out the sludge liquor from the digestion tank, preferably via the sludge discharge section, and to recirculate it through the circulation line back to the digestion tank preferably in the aeration section thereof in the apparatus according to the present invention, the circulated sludge liquor gushes from the nozzle of the liquid/gas ejector into the throat thereof via the aspiration chamber, whereby the humidified oxygen-containing gas is aspirated from the aspiration opening by having resort to the thereby caused sucking action to build up the gas/liquid mixed flow which is discharged out from the throat. By jetting the gas/liquid mixed flow preferably towards the throat of the liquid/liquid ejector, the sludge liquor present in the upper part of the digestion tank is sucked up by making use of the hydrodynamic action of the jetted flow and is mixed with the gas/liquid mixed flow to effect fine disintegration of the bubbles, facilitating the dissolution of oxygen into the sludge liquor. By passing the mixed flow discharged from the throat of the liquid/liquid ejector further downwards through the downward directing pipe, the gas bubbles are subjected to further disintegration by the force of the floating up of the bubbles and are then introduced into the digestion tank. In the course of floating up in the digestion tank, the bubbles are subject to the gas dissolution into the sludge liquor, before the remaining gas bubbles floating on the upper surface of the sludge liquor will flood over into the sludge discharge section and are discharged out from an exit port together with the digested sludge. The digested sludge is discharged via a digested sludge line which may not be provided with a water seal at the exit or, if a water seal is provided, the water head thereof should be such that exhaustion of gas (foam) from the digestion tank will not be obstructed. When the digested sludge line is provided with such an exit port at a portion below the liquid surface level, a gas discharge line should be arranged separately. Here, gas bubbles will accumulate in the digestion tank above the liquid level to build up a foam layer. As the thickness of the foam layer increases, destruction of foam bubbles due to their own weight is facilitated, whereby a steady state will be reached at a certain foam layer thickness. Therefore, flooding over of foam into the gas discharge line may be prevented by designing the digestion tank to have a sufficient height of space above the liquid surface, while it is favorable also to arrange a foam destroying means in the vicinity of the gas discharge line. Even if the aeration digestion described above is continued for a prolonged period of time, clogging trouble due to encrustation of sludge can be prevented, since the oxygen-containing gas is humidified.

By the apparatus for aerobic digestion according to the present invention, it is possible to suck up a large amount of sludge liquor to mix with the oxygen-containing gas to attain efficient dissolution of oxygen into the sludge liquor at a lower pressure drop by making use of the highly energetic action of the gas/liquid mixed flow, by producing the gas/liquid mixed flow by arranging the liquid/gas ejector at the terminal end of the circulation line and jetting the mixed flow delivered therefrom out, preferably directly into the liquid/liquid ejector. By this, the oxygen-containing gas can be dissolved into the sludge liquor efficiently at a lower energy consumption rate. Therefore, the aerobic digestion can be performed efficiently while suppressing the foaming phenomenon by limiting the supply rate of the oxygen-containing gas and while maintaining the requisite concentration of the dissolved oxygen, even in the case where a severe foaming phenomenon occurs by the modified sludge, by keeping the concentration and the supply rate of the oxygen-containing gas at the values in the range given above.

As described above, the apparatus and the process for aerobic digestion of organic sludges according to the present invention can perform aerobic digestion efficiently and steadily over a prolonged period of time without suffering from the problem of clogging of the supply line for the oxygen-containing gas, due to the construction provided with a liquid/gas ejector and a downward directing pipe arranged in such a way that either the oxygen-containing gas which is humidified through a humidification means or a mixture of the oxygen-containing gas with a humidifying liquid is supplied to the liquid/gas ejector.

By the apparatus and the process according to the present invention, the aerobic digestion can be realized efficiently and steadily over a prolonged period of time without suffering from the problem of clogging of the supply line for the oxygen-containing gas, with simultaneous attainment of an increased degree of digestion of the organic sludges, by incorporation of the construction provided with a liquid/gas ejector, a downward directing pipe and a modifier arranged in such a way, that either the oxygen-containing gas which is humidified through a humidification means or a mixture of the oxygen-containing gas with a humidifying liquid is supplied to the liquid/gas ejector.

The apparatus and the process for aerobic digestion of organic sludges according to the present invention can perform aerobic digestion efficiently and steadily over a prolonged period of time without suffering from the problem of clogging of the supply line for the oxygen-containing gas, with simultaneous attainment of an increased degree of digestion of the organic sludges and suppression of foaming phenomenon, by incorporation of the construction provided with a liquid/gas ejector, a downward directing pipe and a modifier arranged in such a way, that either the oxygen-containing gas which is humidified through a humidification means or a mixture of the oxygen-containing gas with a humidifying liquid is supplied to the liquid/gas ejector, while controlling the supply in such a manner that an oxygen-containing gas having a specific oxygen concentration is supplied at a specific supply rate.

The Best Mode for Embodying the Invention

Below, the present invention will further be described by way of modes of embodiment.

Figure 1:
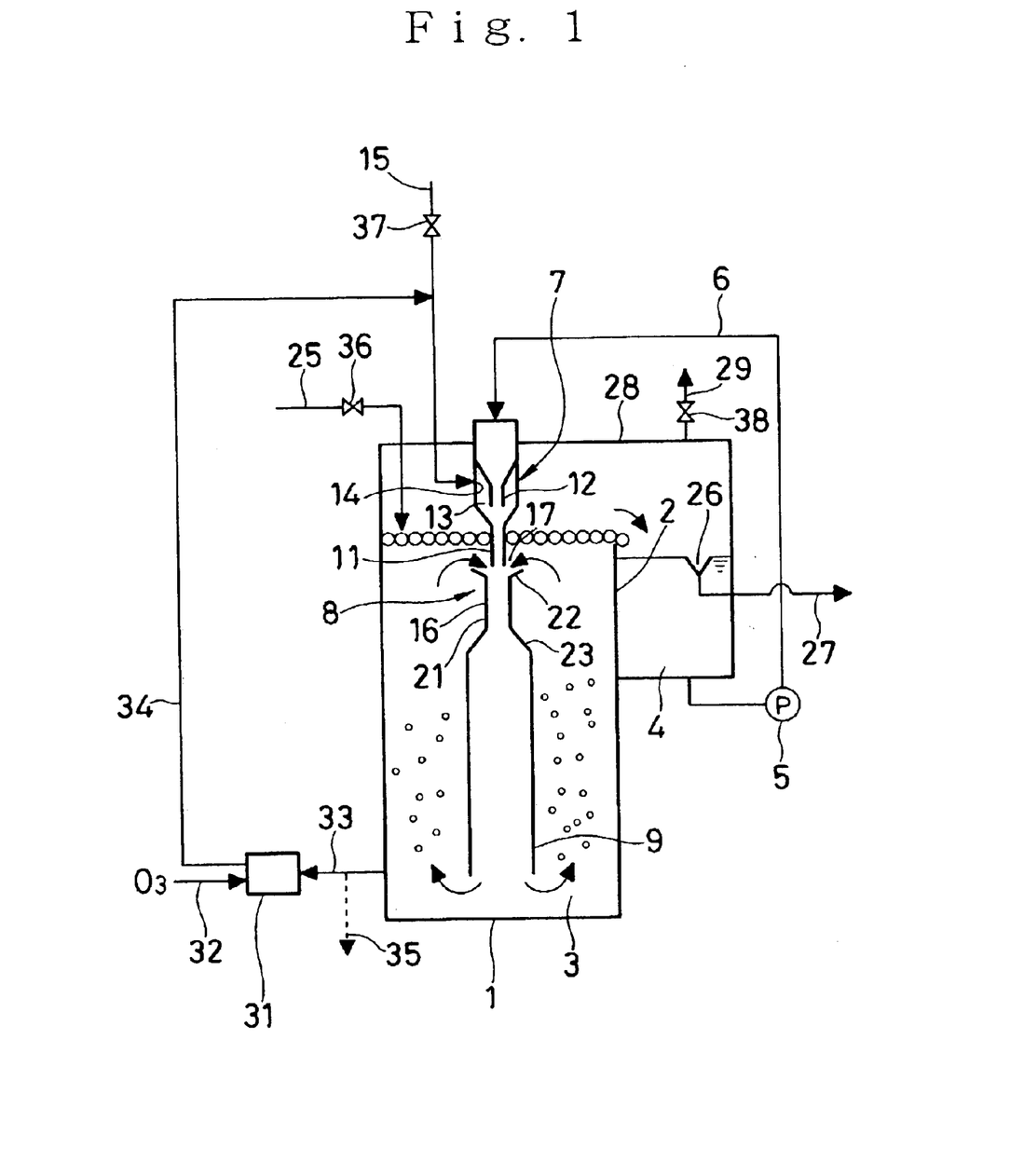
FIG. 1 is a flow diagram of an embodiment of the apparatus for aerobic digestion of organic sludges according to the present invention.

An embodiment of the apparatus for aerobic digestion according to the present invention is given in FIG. 1 in a flow diagram, in which a gas/liquid mixed flow resulting from an ozone treatment of an extracted sludge is used as the humidified oxygen-containing gas.

In FIG. 1, the numeral 1 represents a digestion tank which is partitioned by a partition wall 2 into an aeration section 3 and a sludge discharge section 4, wherein a circulation line 6 provided with a pump 5 is arranged so as to connect the bottom of the sludge discharge section 4 to upper part of the aeration section 3. At the delivery end of the circulation line 6, there are arranged a liquid/gas ejector 7, a liquid/liquid ejector 8 and a downward directing pipe 9 of a form of barrel aligning downwards successively in direct connection in the vertical direction.

The liquid/gas ejector 7 is arranged at the end of the circulation line 6 at a position above the liquid surface of the aeration section 3 of the digestion tank 1 in such a manner that the front end of its throat 11 is immersed in the liquid layer. The liquid/gas ejector 7 is constituted of a nozzle 12 disposed at the end of the circulation line 6, an aspiration chamber 13 arranged so as to surround the nozzle 12, an aspiration opening 14, which opens into the aspiration chamber 13, and the throat 11 formed at the front end of the aspiration chamber 13 with the throat end being held under intrusion into the liquid layer, wherein the aspiration chamber 14 is connected with an oxygen-containing gas supply line 15.

The liquid/liquid ejector 8 is constituted of a nozzle consisting of the throat 11 of the liquid/gas ejector 7, a throat 16 situated in the sludge liquor in opposition to the nozzle and a sludge liquor sucking gap 17 formed between the nozzle (11) and the throat 16.

The liquid/gas ejector 7 is constructed so as to aspirate the oxygen-containing gas by jetting the circulated sludge liquor and the liquid/liquid ejector 8 is constructed so as to suck up the sludge liquor present in the upper portion of the digestion tank 1 by jetting the gas/liquid mixed flow. The nozzle 12 of the liquid/gas ejector 7 is disposed on a vertical straight line in opposition to the throat 11 so as not to restrain the gushing power of the circulated sludge liquor. The throat 11 of the liquid/gas ejector 7 (namely, the nozzle of the liquid/liquid ejector 8) is also disposed on a vertical straight line in opposition to the throat 16 so as not to restrain the gushing power of the gas/liquid mixed flow. The throat 11 of the liquid/gas ejector 7 is designed so as not to restrain the gushing power of the gas/liquid mixed flow by leaving the front end thereof as cut open without forming any constriction. The throat 16 of the liquid/liquid ejector 8 is formed as a narrowest part 21 between two widened parts 22 and 23 disposed each on the suction side or on the delivery side. The delivery side of the widened part 23 joins to a downward directing pipe 9 having a widened diameter arranged open to the bottom portion of the digestion tank 1.

The aeration section 3 is connected with a sludge supply line 25. At an upper portion of the sludge discharge section 4 is provided an exit port 26 which opens at a position on a level somewhat lower than the upper end of the partition wall 2 and communicates with a digested sludge line 27. The digestion tank 1 is provided at its upper part with a coverage 28 so as to build up a substantially sealed structure. The coverage 28 is provided with a gas discharge line 29.

The numeral 31 represents an ozone-treating unit provided with an ozone supply line 32, with a sludge extraction line 33 communicating with a lower portion of the aeration section 3 and with a gas/liquid mixed flow line 34 connected to the oxygen-containing gas supply line 15. 35 represents an excess sludge extracting line and 36, 37 and 38 each represent a valve.

The apparatus for aerobic digestion of FIG. 1 is operated in such a way, that the sludge liquor is drawn out from the sludge discharge section 4 by actuating the pump 5 and is caused to recirculate to the aeration section 3 of the digestion tank 1 through the circulation line 6, whereby the circulated sludge liquor gushes into the throat 11 from the nozzle 12 of the liquid/gas ejector 7 via the aspiration chamber 13 to thereby build up a gas/liquid mixed flow under aspiration of the oxygen-containing gas, which has been humidified, via the aspiration opening 14 from the oxygen-containing gas supply line 15 by making use of the hydrodynamic aspirating action produced. Here, the gas/liquid mixed flow gushes towards the throat 16 of the liquid/liquid ejector 8, whereby the sludge liquor in the upper part of the digestion tank is sucked up from the sludge liquor sucking gap 17 by having resort to the gushing power of the mixed flow to cause the sucked sludge liquor with the gas/liquid mixed flow to effect fine disintegration of the gas bubbles to cause dissolution of the oxygen-containing gas. The mixed flow jetted out of the throat 11 of the liquid/liquid ejector 8 then passes downwards through the downward directing pie 9, whereby the mixed flow is subjected to an intensive agitation action caused by the force of the floating up of the gas bubbles, so that the mixed flow is discharged into the digestion tank 1 from the downward directing pipe 9 at its lower end in a state in which the gas bubbles are finely disintegrated. The gas bubbles are subject to dissolve into the sludge liquor even during they are floating up in the digestion tank, until they are brought together into a foam layer which is transferred to the sludge discharge section 4 together with the sludge liquor flooding over the upper edge of the partition wall 2. From the sludge discharge section 4, the digested sludge found near the liquid surface flows into the exit port together with the floating foam and is discharged via the digested sludge line 27. The sludge liquor in the aeration section 3 may preferably be maintained at a temperature in the range from 30 to 70° C. to subject it to a high-temperature digestion.

The digested sludge line 27 may favorably be devoid of any liquid seal at its exit or be provided with a liquid seal of a liquid depth within a range not harmful to the discharge of the sludge liquor (foam) from the digestion tank 1. Since the digestion tank 1 is covered wholly by the coverage 28 to be maintained substantially in a sealed state, it is held under a pressurized condition by the gas aspirated thereinto, whereby discharge of the foam is facilitated.

The raw sludge liquor (sludge liquor to be treated) is guided into the aeration section 3 via the sludge supply line 25. The organic sludge in the digestion tank 1 is aerated by the oxygen-containing gas aspirated thereinto, whereby the oxidizable components in the sludge, such as organic matters, are subjected to an oxidative biodegradation by the action of microorganisms.

Concurrently with the aeration treatment, an ozone treatment of the sludge liquor is performed. Thus, a part of the sludge (sludge liquor in the tank) is extracted out via a sludge extraction line 33 and the extracted sludge is subjected to ozone treatment by bringing it into contact with an ozone gas fed via an ozone feed line 32 to modify it into an easily biodegradable product. The ozone-treated gas/liquid mixed fluid, namely, the mixed fluid composed of the spent ozone gas and the treated sludge liquor, is guided as such, i.e. without separating the spent ozone gas, into the oxygen-containing gas supply line 15 via a gas/liquid mixed flow line 34 and then into the liquid/gas ejector 7 via the aspiration opening 14. If the amount of the oxygen-containing gas is insufficient with only the gas/liquid mixed flow being sucked up, it is permissible to additionally supply another oxygen-containing gas, such as atmospheric air or others, to the oxygen-containing gas supply line 15.

When an oxygen-containing gas which is not humidified is employed, as in the prior technique, the oxygen-containing gas supply line may be apt to suffer from clogging problems in the aspiration chamber 13, in particular, when the organic sludges are treated by a high-temperature digestion at a temperature in the range from 30 to 70° C. by encrustation due to drying of splashes of the sludge. However, using the apparatus shown in FIG. 1 according to the present invention, encrustation due to drying of splashes of sludge in the portion around the aspiration chamber 13 is suppressed, since the gas/liquid mixed fluid is supplied as a humidified fluid comprising the oxygen-containing gas, whereby the problem of clogging of the flow line is avoided and the cleaning work necessary to remove the encrustation can be reduced, so that the aerobic digestion can be realized efficiently and steadily over a prolonged period of time.

In the embodiment as given in FIG. 1, the degree of digestion of the biosludge is increased, since the ozone-treated sludge is returned to the digestion tank 1 to subject it to the aerobic digestion again. The digested sludge is discharged via the digested sludge line 27 and is then subjected to solid/liquid separation by, for example, a centrifuge or a membrane separator, to discard the resulting supernatant and to recirculate the resulting concentrated sludge back to the digestion tank, whereby the substantial residence time of the biosludge in the digestion tank can be extended to thereby increase the rate of biodegradation of the biosludge (illustration thereof is omitted). If an excess sludge occurs, it is exhausted out via an excess sludge exhaustion line 35.

In addition, according to the embodiment as given in FIG. 1, a higher performance for sucking up and mixing the sludge liquor can be attained by the hydrodynamic action of jetting of the gas/liquid mixed flow at a lower pressure drop, since the liquid/gas ejector 7 is disposed at the end of the circulation line 6 to form the gas/liquid mixed flow and to jet it directly into the liquid/liquid ejector B for effecting sucking up of the sludge liquor found in the upper part of the digestion tank 1 and mixing it with the jetted gas/liquid mixture. Moreover, an efficient dissolution of the oxygen-containing gas into the sludge liquor can be attained, since the thereby formed gas/liquid mixed flow is guided downwards through the downward directing pipe 9 reverse to the force of floating up of the bubbles, whereby the bubbles are subjected to intense agitation. The gas/liquid mixed flow discharged out of the downward directing pipe 9 contains large amounts of finely disintegrated bubbles of oxygen-containing gas suspended therein, which dissolve into the sludge liquor during floating up to the liquid surface. In this manner, dissolution of the oxygen-containing gas into the sludge liquor can efficiently be performed at a lower energy consumption.

If there is a fear of occurrence of foaming of the sludge liquor in the aeration section 3 of the apparatus given in FIG. 1, this foaming phenomenon can be evaded by controlling the operation of the apparatus so as to maintain the oxygen content in the gas/liquid mixed flow sucked up by the liquid/gas ejector 7 at a value in the range from 30 to 100% by volume, preferably from 50 to 100% by volume, and keeping the supply rate of the oxygen-containing gas at a value in the range from 0.1 to 0.4 $Nm^3/hr$, preferably from 0.2 to 0.4 $Nm^3/hr$, per 1 $m^3$ of the capacity of the aeration section 3, whereby the aerobic digestion can be attained efficiently.

The oxygen content can be adjusted by, for example, supplying pure oxygen delivered from, for instance, an oxygen generator, liquid oxygen bomb or the like, and a gas other than pure oxygen, such as air or so on, at an adequate proportion. The supply rate of the oxygen-containing gas may be adjusted by, for example, adjusting the degree of opening of the valve 37 disposed in the oxygen-containing gas supply line 15, adjusting the delivery pressure of the pump 5 installed in the circulation line 6 or adjusting the flow rate in the circulation line 6.

While the embodiment of FIG. 1 employs a coverage 28 covering both the aeration section and the sludge discharge section 4, it is permissible to use a coverage which covers only the aeration section 3.

Figure 2:
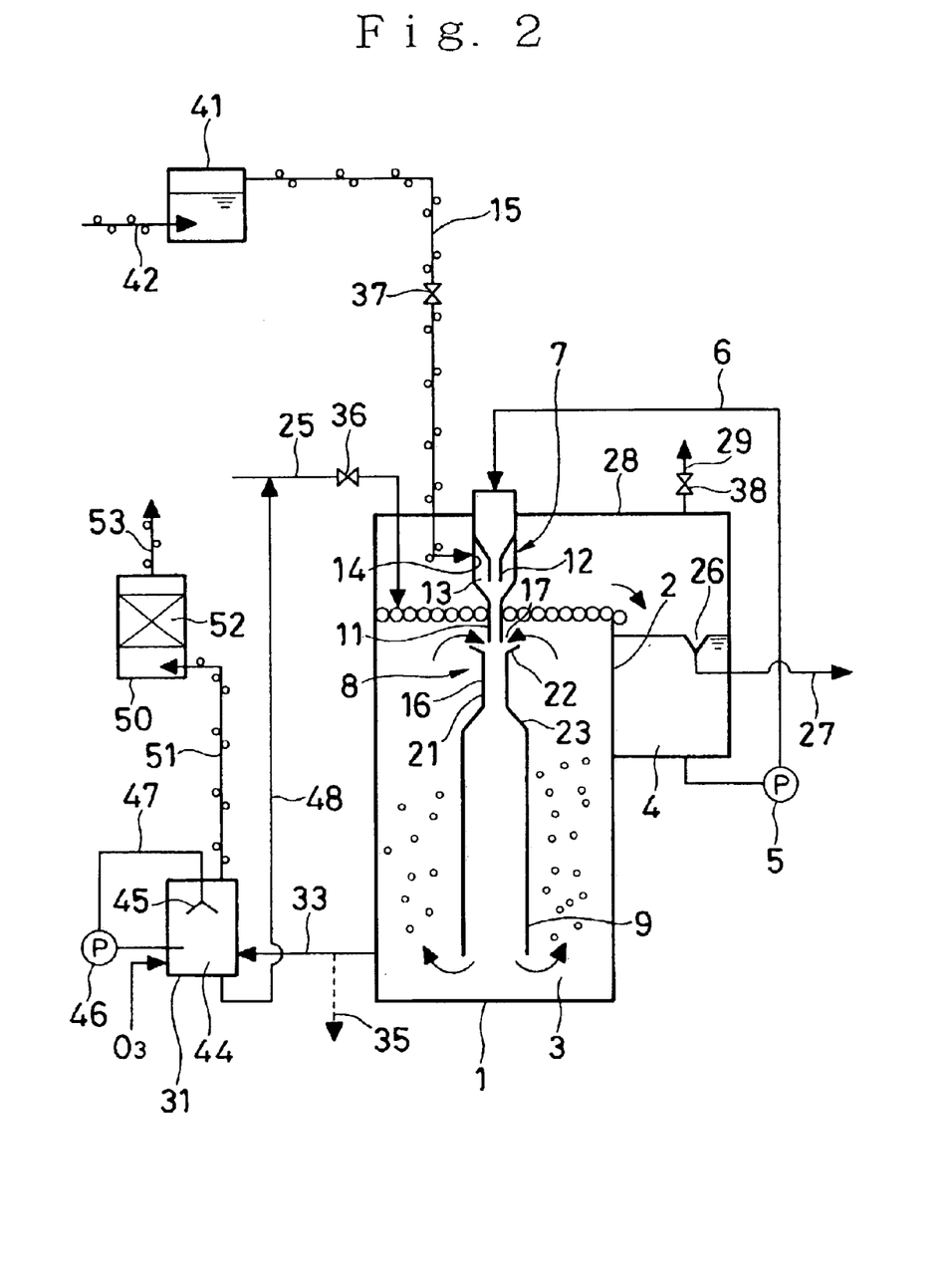
FIG. 2 is a flow diagram of another embodiment of the apparatus for aerobic digestion of organic sludges according to the present invention.

Another embodiment of the aerobic digestion apparatus is given in FIG. 2 in a flow diagram, in which the oxygen-containing gas is supplied to the liquid/gas ejector after it has been humidified by a humidifying means.

In FIG. 2, 41 indicates a humidifying vessel filled with water, which is constructed in such a way that the oxygen-containing gas guided from the gas inlet line 42 is passed through the water layer to humidify it, whereupon the resulting humidified oxygen-containing gas is guided to the oxygen-containing gas supply line 15.

The ozone treating unit 31 is constructed such that it comprises a reaction chamber 44 provided therein at its upper portion with a liquid spray 45 for destroying foam, to which a recycling line 47 having a pump 46 for recycling the sludge liquor held in the chamber 44 is connected, wherein the sludge liquor in the reaction chamber 44 is sucked up by the pump 46 and conducted through the recycling line 47 to spray from the liquid spray 45 over the sludge liquor layer held therein to destroy the foam accumulated on the sludge liquor layer while performing the ozone treatment. To the reaction chamber 44 is connected at its lower portion an ozone-treated liquor transfer line 48 through which the ozone-treated sludge liquor is returned to the aeration section 3 via the sludge supply line 25. The reaction chamber 44 is connected at its top with a spent ozone gas line 51 communicating to a spent ozone gas treating unit 50 operative to decompose the remaining ozone by contact with activated carbon 52 and to discharge the treated gas via a gas exhaustion line 53. Other constructions are the same as those of FIG. 1.

In the embodiment of the apparatus given in FIG. 2, the oxygen-containing gas is supplied via the aspiration opening 14 after it has been humidified in the humidifying vessel 41 to perform the aeration. In the ozone treating unit 31, ozone treating is performed while effecting destruction of foam by spraying the sludge liquor in the reaction chamber from the liquid spray 45. The ozone-treated sludge freed from the spent ozone gas is withdrawn via the ozone-treated sludge transfer line 48 and is returned to the aeration section 3 via the sludge supply line 25, while the spent ozone gas is disposed of in the spent ozone gas treating unit 50. Other procedures are the same as those of FIG. 1.

The apparatus of the embodiment given in FIG. 2 reveals an advantageous feature that the ozone-treated sludge is not brought into contact with the throat 11 and the aspiration chamber 13 and, thus, corrosion at the throat 11 and at the aspiration chamber 13 may difficultly occur, whereby it is permitted to construct the throat 11 and the aspiration chamber 13 from an inexpensive corrosion-susceptible material.

Figure 3:
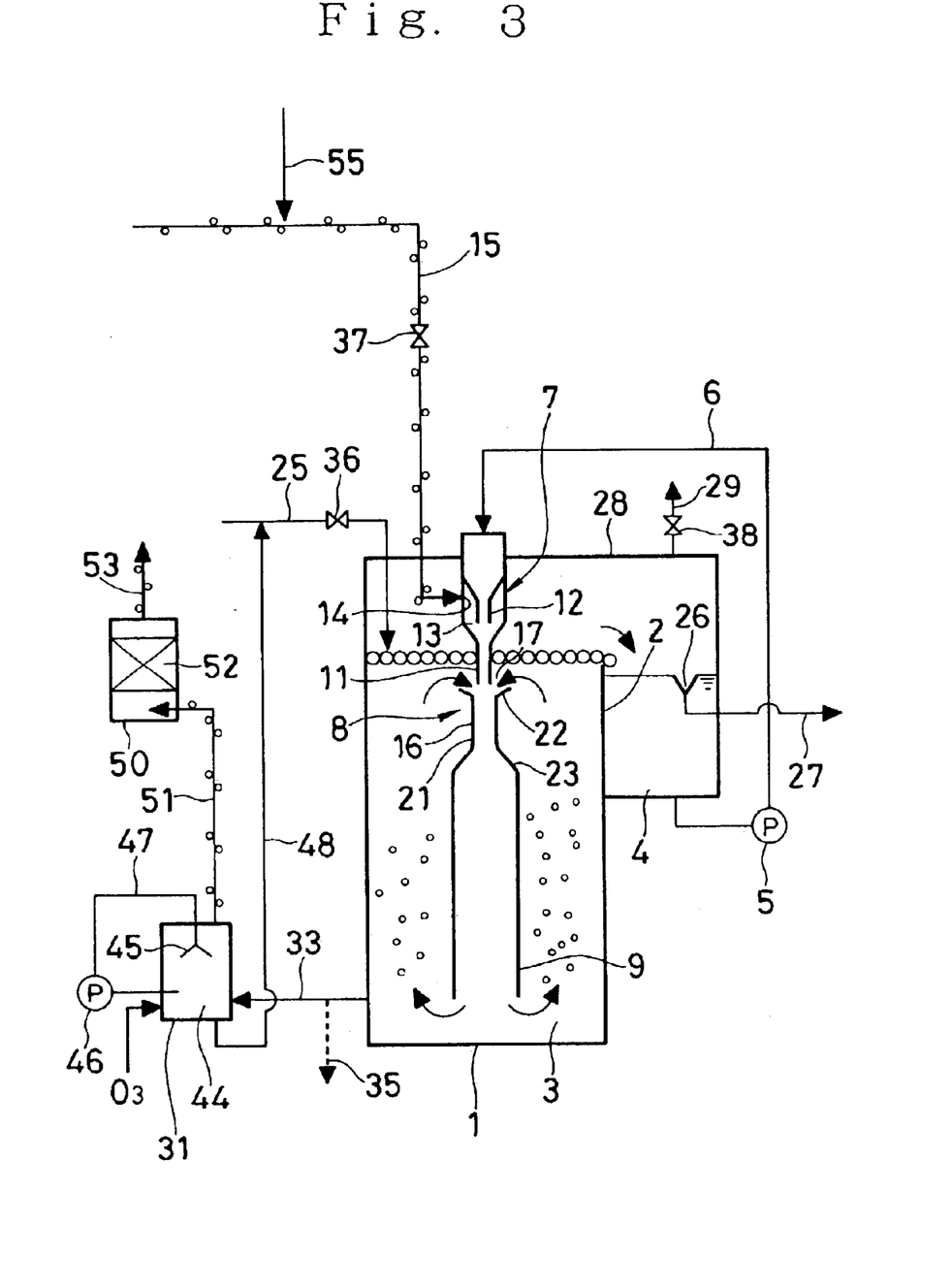
FIG. 3 is a flow diagram of a further embodiment of the apparatus for aerobic digestion of organic sludges according to the present invention.
Figure 4:
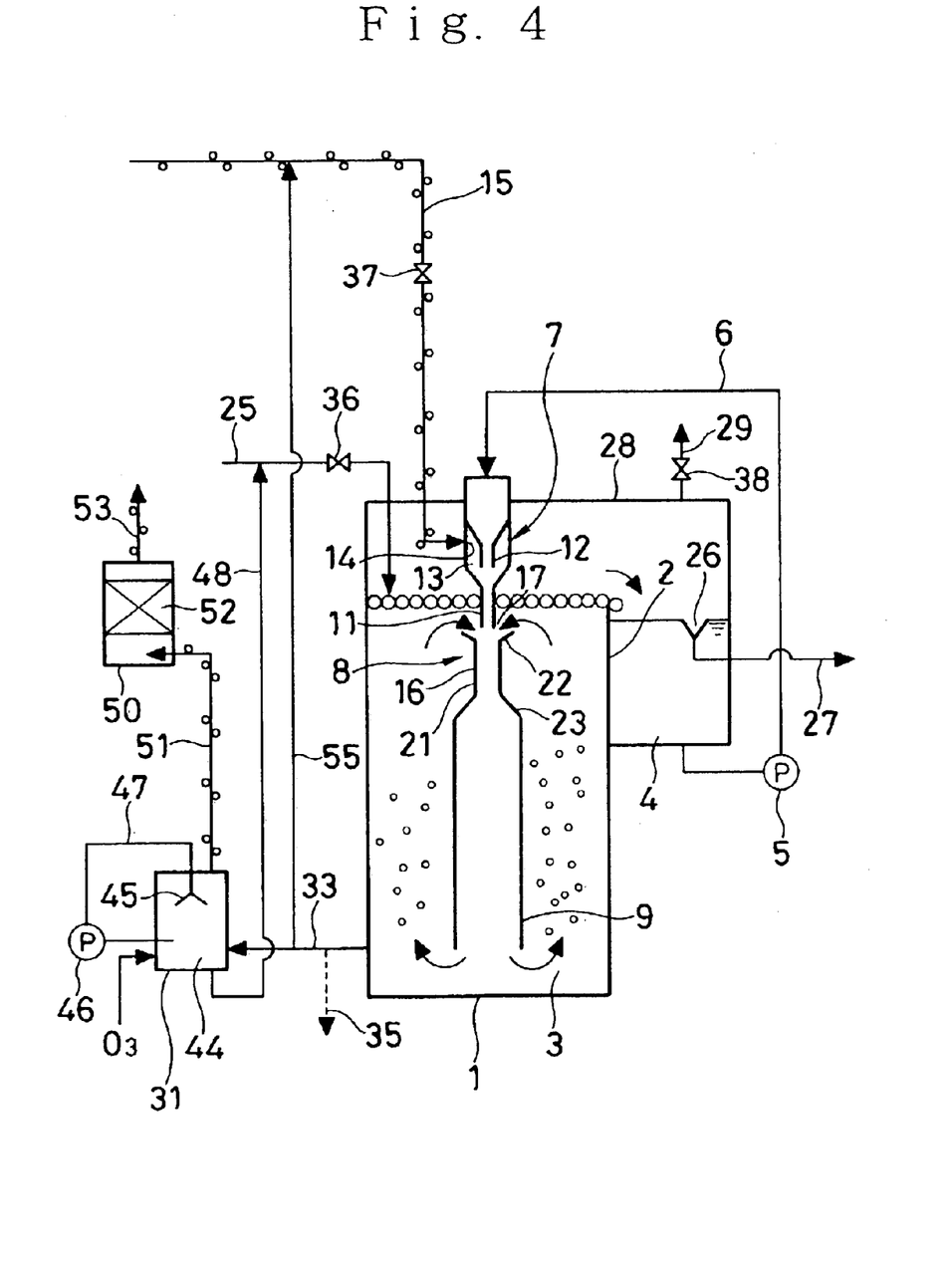
FIG. 4 is a flow diagram of a still further embodiment of the apparatus for aerobic digestion of organic sludges according to the present invention.

FIGS. 3 and 4 show further embodiments of the apparatus for aerobic digestion according to the present invention, both in a flow diagram, in which the oxygen-containing gas humidified by a humidifying liquid is supplied to the liquid/gas ejector.

In FIG. 3, 55 represents a humidifying liquid feed line which communicates to the oxygen-containing gas supply line 15 and serves for feeding a tap water as the humidifying liquid. Other constructions are the same as those of FIG. 2.

In the apparatus of the embodiment shown in FIG. 3, the humidified oxygen-containing gas is prepared by guiding tap water into the oxygen-containing gas supply line 15 via the humidifying liquid feed line 55 to mix with the oxygen-containing gas and the resulting oxygen-containing gas is guided to the gas/liquid ejector at its aspiration opening 14. Other procedures are the same as those of the embodiment of FIG. 2.

The embodiment of FIG. 3 reveals an advantageous feature that the humidifying vessel can be dispensed with.

In the apparatus of the embodiment shown in FIG. 4, the humidifying liquid feed line 55 is branched from a sludge extraction line 33 and is connected to the oxygen-containing gas supply line 15. Other constructions are the same as those of the embodiment of FIG. 3.

In the apparatus of the embodiment shown in FIG. 4, the sludge liquor extracted from the aeration section 3 is supplied to the oxygen-containing gas supply line 15 via the humidifying liquid or gas feed line to humidify the oxygen-containing gas. Other procedures are the same as those of the embodiment of FIG. 3.

The embodiment of FIG. 4 has an advantageous feature that a surface level change in the digestion tank due to introduction of tap water or the like can be put out of caution.

Figure 5:
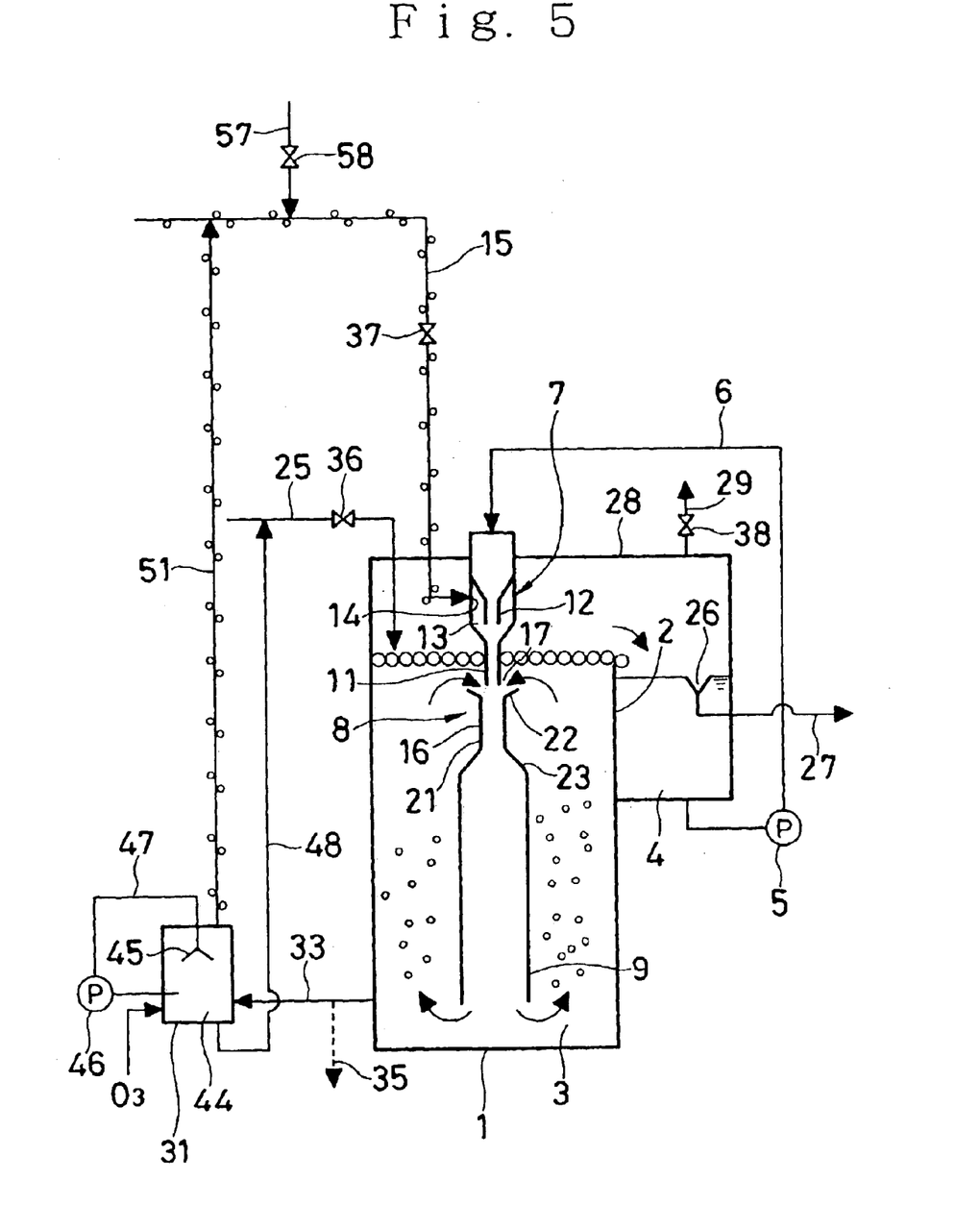
FIG. 5 is a flow diagram of a still further embodiment of the apparatus for aerobic digestion of organic sludges according to the present invention.

FIG. 5 gives a still further embodiment of the apparatus for aerobic digestion according to the present invention in a flow diagram, in which the oxygen-containing gas humidified by a humidifying gas is guided to the liquid/gas ejector.

The apparatus given in FIG. 5 is constructed such that the spent ozone gas line 51 is connected as a humidifying gas supply line to the oxygen-containing gas supply line 15 for using the spent ozone gas as the humidifying gas. The oxygen-containing gas supply line 15 is connected with an air feed line 57 provided with a valve 58 for adjusting the rate of air feed to the oxygen-containing gas supply line. Other constructions are the same as those of the embodiment of FIG. 3.

In the apparatus of the embodiment given in FIG. 5, the spent ozone gas exhausted from the ozone-treating unit 31 is guided to the oxygen-containing gas supply line 15 via the spent ozone gas line 51 to humidify the oxygen-containing gas. Atmospheric air is guided to the oxygen-containing gas supply line 15 via the air feed line 57 to mix with the oxygen-containing gas, in order to supply the resulting mixed gas to the digestion tank 1 to effect the aeration to thereby strip off the formed carbon dioxide gas from the sludge liquor to maintain the digestion activity of the microbes at a higher level. Here, the digestion is controlled by adjusting the feed rate of air by adjusting the opening degree of the valve 58 in accordance with the value of the pH of the digested sludge liquor observed using a pH meter (not shown), so as to maintain the pH value within the range of from 6 to 8, preferably from 6.5 to 7.7. Other procedures are the same as those of the embodiment of FIG. 3.

The apparatus of the embodiment of FIG. 5 has an advantageous feature that the spent ozone gas is utilized for humidifying the oxygen-containing gas and the digestion activity can be maintained at a higher level, since the formed carbon dioxide gas is stripped off thereby.

EXAMPLES

Below, the present invention will further be described by way of Examples.

Example 1

An organic sludge was treated by aerobic digestion using the apparatus as shown in FIG. 1. Thus, an excess sludge delivered from a waste water treating plant (by the so-called activated sludge method) for treating food industry waste water was subjected to a high-temperature aerobic digestion at a temperature in the range from 50 to 60° C. in a high-temperature aerobic digestion tank having a capacity of 2,000 liters. A part of the sludge liquor in the digestion tank was extracted by a pump at a rate of 200 ml/min and is brought into contact with an amount of an ozone gas (having an ozone concentration of 40 mg/N liter) corresponding to 3%, with respect to the weight of the VSS of the sludge, to modify it. The gas/liquid mixed flow resulting from the modification reaction was supplied as such to a liquid/gas ejector (having a nozzle diameter of 8 mm, with a downward directing pipe having a length of 3.5 m and a diameter of 36 mm). Under such a sucking pressure built up by the liquid/gas ejector that the total gas aspiration rate is adjusted to 1.2 $Nm^3/hr$, gas aspiration was effected, wherein an amount of atmospheric air that supplements the amount of oxygen not fulfilled by the spent ozone gas in the gas/liquid mixed flow was sucked up. On proceeding with the operation, a gradual clogging of the gas supply line occurred with a gradual decrease in the total gas aspiration rate of the gas/liquid mixture, wherein the time interval until the gas supply rate had been decreased to 0.8 $Nm^3/hr$ at which it is assumed to be necessary to clean the liquid/gas ejector was observed to be more than 7 days, namely, a cleaning frequency of once a week would have been permitted. During the experiment, a severe foaming phenomenon occurred in the digestion tank, so that a foam destroying measure by means of a foam destroying device using turbine blades was incorporated.

Examples 2 to 4

Aerobic digestion of organic sludge was carried out under the same conditions as in Example 1 except that each an apparatus given in each of FIGS. 2 to 4 was employed, respectively. Aspiration of atmospheric air by the liquid/gas ejector was incorporated at a rate of 1.2 $Nm^3/min$ and the time interval until the gas supply rate had decreased to 0.8 $Nm^3/min$ was determined. The results are recited in Table 1.

Comparative Example 1

Procedures of Example 2 were followed, except that atmospheric air not humidified was supplied. The results are recited in Table 1.

TABLE 1

|  | Example | | | Comp. Ex. |
| --- | --- | --- | --- | --- |
|  | 2 | 3 | 4 | 1 |
| Condition | A | B | C | D |
| Time till Clogging | 2 days | 4 days | more than 7 days | 24 hours |

Note:
A: Air humidified in the humidifying vessel was supplied.
B: 5 ml/min of tap water were introduced into the oxygen-containing gas supply line.
C: 200 ml/min of extracted sludge were introduced into the oxygen-containing gas supply line.
D: Air without humidification was supplied.

As seen in Table 1, the advantageous effect of using the humidified oxygen-containing gas is clear, since the time interval till clogging is quite extended for the inventive Examples 2 to 4 as compared with that of Comparative Example 1.

While the time interval till clogging was found to be longer for Example 4 than for Example 3, this may be due to the fact that use of tap water brings about inevitable elevation of the liquid surface level in the digestion tank as in Example 3, whereas use of sludge liquor extracted from the digestion tank would have been more effective due to permission of its use in a sufficient amount by circulated supply as in Example 4. On the other hand, Comparative Example 1 showed that a decrease in the rate of supply of the oxygen-containing gas occurred within 24 hours, requiring daily cleaning of the liquid/gas ejector.

Reference Example 1

For the aerobic digestion, use of the liquid/gas ejector was dispensed with and conditions as given in the following 1) to 8) were employed:

1) The sludge: a concentrated sludge obtained by centrifugation of an excess sludge delivered from a waste water treating plant (by the so-called activated sludge method) for treating food industry waste waster.
2) Concentration of the feed sludge: 35,000 to 42,000 mg/liter as MLSS concentration.
3) Feed rate of the sludge: 150 liters per day; introduced into the digestion tank.
4) Capacity of the digestion tank: 2,000 liters.
5) Ozone treatment: The sludge liquor in the digestion tank was extracted continuously at a rate of 200 ml/min, which was subjected to an ozone treatment after having been adjusted at a pH of 3.0–3.5 with sulfuric acid, before being returned to the digestion tank. The rate of supply of ozone was 3%, with respect to the weight of the VSS.
6) Preconditioning of the sludge: The sludge was preconditioned for 60 days by operating the digestion apparatus under the conditions as given above at a spent ozone flow rate of 0.18 $Nm^3$/hr per 1 $m^3$ of the capacity of the digestion tank at an oxygen concentration of 90% by volume, whereupon comparative experiments were performed under varied conditions.
7) Performance of sludge amount reduction: From the digestion tank, a definite amount of sludge liquor is extracted and is subjected to a centrifugal thickening by a centrifugal concentrator to obtain a thickened sludge which is returned to the digestion tank and a supernatant liquor which is discarded in order to compensate for the amount of supply of the raw sludge to the digestion tank. The degree of sludge amount reduction calculated from the integrated amount of raw sludge supplied to the digestion tank and the content of SS in the discarded supernatant liquor was not lower than 95%.
8) Judgment basis for occurrence of severe foaming: The digestion tank, designed to have a free board height (the height from the liquid surface to the upper edge of the tank) of 700 mm which is typical for the digestion tank of this kind and devoid of any mechanical means for destroying foam on the liquid surface, was brought into operation and the occurrence of foam flooded over the upper flooding edge of the tank was judged as the occurrence of severe foaming.

Using the apparatus as shown in FIG. 1, an aeration experiment was carried out without operating the liquid/gas ejector, but instead, by blowing the oxygen-containing gas into the sludge liquor using an ordinary gas diffuser. The ozone-treated sludge was guided to a separately installed gas/liquid separator to separate from the spent ozone gas before being returned to the digestion tank. The experiment results are summarized in Table 2.

TABLE 2

Results of Reference Example 1

| Experiment | Run 1-1 | Run 1-2 | Run 1-3 | Run 1-4 |
| --- | --- | --- | --- | --- |
| $O_2$ content in $O_2$-cont. gas (vol. %) | 21 | 21 | 90 | 90 |
| $O_2$-cont. gas supply rate ($Nm^3/m^3$/hr) | 1.0 | 0.5 | 0.5 | 0.4 |
| Dissolved $O_2$ conc. in tank sludge (ml/l) | 0.0 | 0.0 | 1.8 | 0.1 |
| Occurrence of severe foaming | yes | yes | yes | no |

As seen in Table 2, occurrence of severe foaming was avoided when the oxygen-containing gas supply rate was reduced to a level not exceeding 0.4 $Nm^3$/hr per 1 $m^3$ of tank capacity by using an ordinary gas diffuser. However, it was necessary to use an oxygen-containing gas having an oxygen content of 90 volume %, in order to maintain the dissolved oxygen concentration (DO) in the sludge liquor in the digestion tank from being zero.

Example 5

Using the apparatus shown in FIG. 5, digestion treatment of sludge was carried out. The ozone-treated sludge was returned back to the digestion tank 1 via the transfer line 48. The spent ozone gas which had been humidified in the ozone-treating unit 31 was supplied to the oxygen-containing gas supply line 15 via the spent ozone gas line 51. The rate of aspiration of atmospheric air was adjusted by adjusting the degree of opening of the valve 58 disposed in the air supply line 57 during the starting period by hand operation so as to settle the total air supply rate at 1.2 $Nm^3$/hr by making use of the aspirating pressure built up by the liquid/gas ejector, whereupon the time interval until the supply rate has been decreased to the value of 0.8 $Nm^3$/hr which is assumed to be the rate at which cleaning of the gas/liquid ejector is required was observed to be two days. The pH value of the sludge liquor in the digestion tank at this occasion was found to be 6.0. Then, the air supply rate was controlled in such a manner that the opening degree of the valve 58 was increased when the observed pH value by a pH meter disposed in the digestion tank was lower than 6.5 and was decreased when the observed pH value was higher than 6.5, whereby it was able to effect the treatment at a pH value of 6.5, which is regarded as favorable for the biodegradation of biosludge at an air supply rate of 1.6 $Nm^3$/hr. In Example 5, conditions not specifically mentioned were the same as in Example 3.

Example 6

Using the apparatus as given in FIG. 1, aerobic digestion was carried out under the same conditions as that in Reference Example 1. Here, however, the ozone-treated sludge liquor was not subjected to gas/liquid separation and the aeration was effected by utilizing the remaining oxygen in the spent ozone gas. Experiments were carried out at varying rates of supply of spent ozone gas and varying oxygen content in the oxygen-containing gas. The supply rate of the spent ozone gas supplied to the digestion tank was adjusted using a valve disposed in the flow line for an oxygen-containing gas to be fed for producing ozone gas. The oxygen content was adjusted by using a gas mixture to be fed as the raw gas for the ozone gas, prepared by admixing a pertinent volume of atmospheric air to the oxygen generator delivery gas having 90% oxygen, by altering the proportion of the addition of atmospheric air. The results are summarized in Table 3.

TABLE 3

Results of Example 6

| Experiment | Run 2-1 | 2-2 | 2-3 | 2-4 | 2-5 |
|---|---|---|---|---|---|
| $O_2$ content in $O_2$-cont. gas (vol. %) | 21 | 21 | 21 | 30 | 30 |
| $O_2$-cont. gas supply rate ($Nm^3/m^3$/hr) | 0.5 | 0.4 | 0.3 | 0.4 | 0.3 |
| Dissolved $O_2$ conc. in tank sludge (mg/l) | 0.8 | 0.1 | 0.0 | 2.0 | 0.2 |
| Occurrence of severe foaming | yes | no | no | no | no |

As seen in Table 3, occurrence of severe foaming was able to be avoided by restricting the supply rate of oxygen-containing gas to be not higher than 4 $Nm^3$/hr per 1 $m^3$ of the digestion tank capacity even by using the liquid/gas ejector. Here, however, the remaining dissolved oxygen concentration in the sludge liquor in the digestion tank reached zero in run 2-3, giving birth to a fear of building up of an anaerobic state in the digestion tank, resulting in a reduction of the rate of biodegradation by the living biosludge. It was able to prevent the occurrence of an anaerobic state, by increasing the oxygen content of the oxygen-containing gas to be supplied up to 30 volume % or higher. By the way, it is seen by comparing the results of the experiments between Example 6 and Reference Example 1, that it is advantageous to use a liquid/gas ejector which is superior in the oxygen dissolution performance in order to maintain the digestion tank under aerobic conditions while suppressing the occurrence of severe foaming by having recourse to the present invention. Thus, the present invention was able to be practiced even without using an oxygen-containing gas having an oxygen content higher than that of atmospheric air.

What is claimed is:

1. An apparatus for aerobic digestion of an organic sludge containing a biosludge, comprising
   an aerobic digestion tank for performing an aerobic biological digestion of the organic sludge introduced thereinto by an oxygen-containing gas supplied thereto,
   a circulation line provided with a pump for drawing out the sludge in the aerobic digestion tank and pumping it into the aerobic digestion tank,
   a liquid/gas ejector for aspirating the oxygen-containing gas and mixing it with a circulated sludge delivered via the circulation line to form a gas/liquid mixed flow,
   an oxygen-containing gas supply line for supplying the oxygen-containing gas to the liquid/gas ejector,
   a means for humidifying the oxygen-containing gas and
   a downward directing pipe extending towards the bottom of the aerobic digestion tank, for passing downwards therethrough the gas/liquid mixed flow formed by the liquid/gas ejector.

2. The apparatus as claimed in claim 1, wherein it further comprises
   a modifier for modifying a part of the sludge extracted from the digestion tank into an easily biodegradable product and
   a modified sludge return line for returning the modified sludge from the modifier to the aerobic digestion tank.

3. The apparatus as claimed in claim 1, wherein it further comprises
   a liquid/liquid ejector disposed submergedly in the sludge in connection with the downward directing pipe for mixing the sludge sucked up from an upper part of the aerobic digestion tank with the gas/liquid mixed flow by making use of the hydrodynamic action of the gas/liquid mixed flow gushing from the liquid/gas ejector.

4. The apparatus as claimed in claim 1, wherein the aerobic digestion tank is designed to perform a high-temperature aerobic digestion of the organic sludge at a sludge temperature as high as 30–70° C.

5. The apparatus as claimed in claim 1, wherein the means for humidifying the oxygen-containing gas is designed to bring the oxygen-containing gas into contact with one or more humidifying substances selected from the group consisting of water, organic sludges, the sludge in the aerobic digestion tank, the modified sludge, other liquids, an exhausted gas from the modifier and other humidified gases.

6. The apparatus as claimed in claim 2, wherein the modifier is an ozone-treating unit.

7. The apparatus as claimed in claim 6, wherein the means for humidifying the oxygen-containing gas is designed to bring the oxygen-containing gas into contact with the ozone-treated sludge and/or with an exhausted gas from the ozone treating unit.

8. A process for aerobic digestion of an organic sludge containing a biosludge, comprising
   performing an aerobic biological digestion of the organic sludge in an aerobic digestion tank by an oxygen-containing gas supplied thereto,
   drawing out the sludge in the aerobic digestion tank and pressing it into the aerobic digestion tank by a pump via a circulation line, aspirating the oxygen-containing gas, which has been humidified, by using a liquid/gas ejector to mix it with a circulated sludge delivered via the circulation line to form a gas/liquid flow, and passing the gas/liquid mixed flow formed by the liquid/gas ejector downwards through a downward directing pipe extending towards the bottom of the aerobic digestion tank.

9. The process as claimed in claim 8, wherein it further comprises extracting out a part of the sludge in the aerobic digestion tank and modifying it in a modifier into an easily biodegradable product and returning the modified sludge obtained in the modifier to the aerobic digestion tank.

10. The process as claimed in claim 8, wherein the sludge in an upper part of the aerobic digestion tank is sucked up and mixed with the gas/liquid mixed flow by making use of the hydrodynamic action of the gas/liquid mixed flow gushing from the liquid/gas ejector, the resulting mixture being guided into the downward directing pipe.

11. The process as claimed in claim 8, wherein the organic sludge is subjected to a biological treatment by a high-temperature aerobic digestion at a temperature as high as 30–70° C.

12. The process as claimed in claim 8, wherein the oxygen-containing gas is humidified by bringing the oxygen-containing gas into contact with one or more humidifying substances selected from the group consisting of water, organic sludges, the sludge in the aerobic digestion tank, the modified sludge, other liquids, an exhausted gas from the modifier and other humidified gases.

13. The process as claimed in claim 9, wherein the modification is effected by an ozone treatment.

14. The process as claimed in claim 8, wherein the concentration of oxygen in the oxygen-containing gas is 30–100 volume % and the supply rate of the oxygen-containing gas per 1 $m^3$ of the capacity of the aerobic digestion tank amounts to 0.1–0.4 $Nm^3$/hr.

* * * * *